United States Patent
Chen

(12)
(10) Patent No.: US 6,400,578 B1
(45) Date of Patent: Jun. 4, 2002

(54) FRAMEWORK OF DISK ARRAY

(75) Inventor: Chih-Chung Chen, Taipei (TW)

(73) Assignee: Portwell Inc. (TW)

( * ) Notice: Subject to any disclaimer, the term of this patent is extended or adjusted under 35 U.S.C. 154(b) by 0 days.

(21) Appl. No.: 09/679,535

(22) Filed: Oct. 6, 2000

(51) Int. Cl.$^7$ .................................................. H02B 4/01
(52) U.S. Cl. ........................ 361/829; 361/685; 361/727; 439/61
(58) Field of Search .................................. 361/681–686, 361/724–730, 796, 798, 803, 807, 809, 810; 439/61, 62, 74, 75; 711/112, 114; 312/223.2

(56) References Cited

U.S. PATENT DOCUMENTS

| | | | | |
|---|---|---|---|---|
| 5,227,957 A | * | 7/1993 | Deters | ........................ 361/395 |
| 5,313,699 A | * | 5/1994 | Freige et al. | .................. 29/632 |
| 5,325,262 A | * | 6/1994 | Ma | .............................. 361/681 |
| 5,333,097 A | * | 7/1994 | Christensen et al. | ......... 361/685 |
| 5,971,804 A | * | 10/1999 | Gallagher et al. | ........... 439/581 |
| 6,112,276 A | * | 8/2000 | Hunt et al. | .................. 711/112 |
| 6,202,291 B1 | * | 3/2001 | Toedtman | ..................... 29/729 |

* cited by examiner

Primary Examiner—Kamand Cureo
Assistant Examiner—Tuan Dinh
(74) Attorney, Agent, or Firm—Troxell Law Office PLLC

(57) ABSTRACT

This invention relates to an improved framework of disk array comprising a frame case in which a plurality of removable hard disk cartridges is neatly arrayed. Each hard disk cartridge contains a power supply and an adapter of disk array signal control device directly connected to the PC board in such a manner as to make the bottom of the removable hard disk not only closer to the PC board, but also the height of the casing lower than the prior art, conducive to receiving more hard disk array system, and achieving higher stability and less failure.

1 Claim, 4 Drawing Sheets

FRAMEWORK OF DISK ARRAY

SUMMARY OF THE INVENTION

The invention relates to an improved framework of disk array in which the removable hard disk cartridge and PC board are so delicately arranged permissible to receive more independent removable hard disk without expanding the fixing area on the casing. It allows lower frame case than the prior art and accommodates more disk array system. Through the connection by means of bus, power supply and disk array signal control device, the said disk array provides higher stability and lesser trouble.

FIG. 4 shows the structure of commonly used disk array frame case 100. The frame case 100 is in the architecture of open drawer, and the power supply 101 and the disk array signal control device 102 are provided at appropriate places. The power supply 101 and the disk array signal control device 102 are linked to the back bus connector of the hard disk respectively. After long time in use for repeated plug in and out, it is easy for the bus to damage the internal wire and to get loosened, causing the system unstable and troubled. The hard disk cartridges are arranged in vertically parallel, requiring enormous space, and the frame must be maintained at a height of more than 4U (1U=4.445 cm.) It is impossible for the standard cabinet of CPU with such a capacity to receive more disk arrays.

Viewing from the aforementioned shortcomings of impossibility to receive more removable hard disk in the frame case of the prior art of the disk array system and the inherent trouble, the inventor of the invention begins numerous researches, designs and modifications in an attempt to eliminate the shortcomings and come up a better solution and an improvement as illustrated in the invention.

The main purpose of the invention is to provide an improved frame case of disk array system in which a plurality of array of removable hard disk cartridge is neatly arranged in parallel on the bottom of the frame case and each removable hard disk has an adapter linked with the PC board. The height of the frame case is less the prior art of frame case where the hard disk cartridge is in the vertically parallel arrangement, but capable of containing more frame cases than the stand computer cabinet.

The technology and methodology of the invention are described in greater detail with aid of the drawings illustrated below.

Terminology and numbering of major mechanical components of the invention.

| | |
|---|---|
| Frame case | 10 |
| PC board | 20 |
| Power supply | 30 |
| Disk array signal control device | 40 |
| Adapter | 50 |
| Removable hard disk cartridge | 60 |
| Hard disk | 70 |
| Support | 80 |

DETAIL DESCRIPTION OF THE INVENTION

Figure 1:
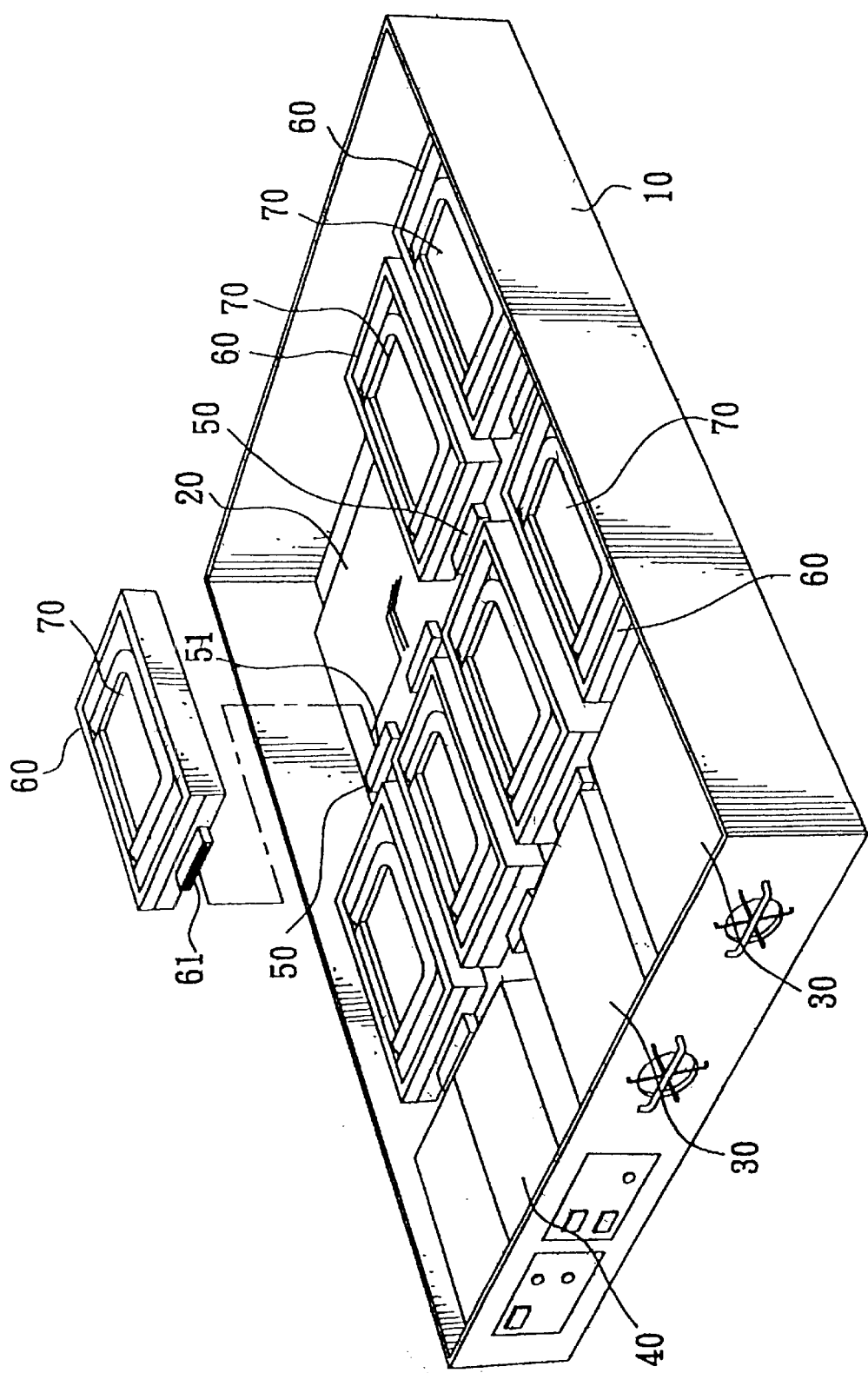
FIG. 1 shows the schematic diagram of stereo view.
Figure 2:
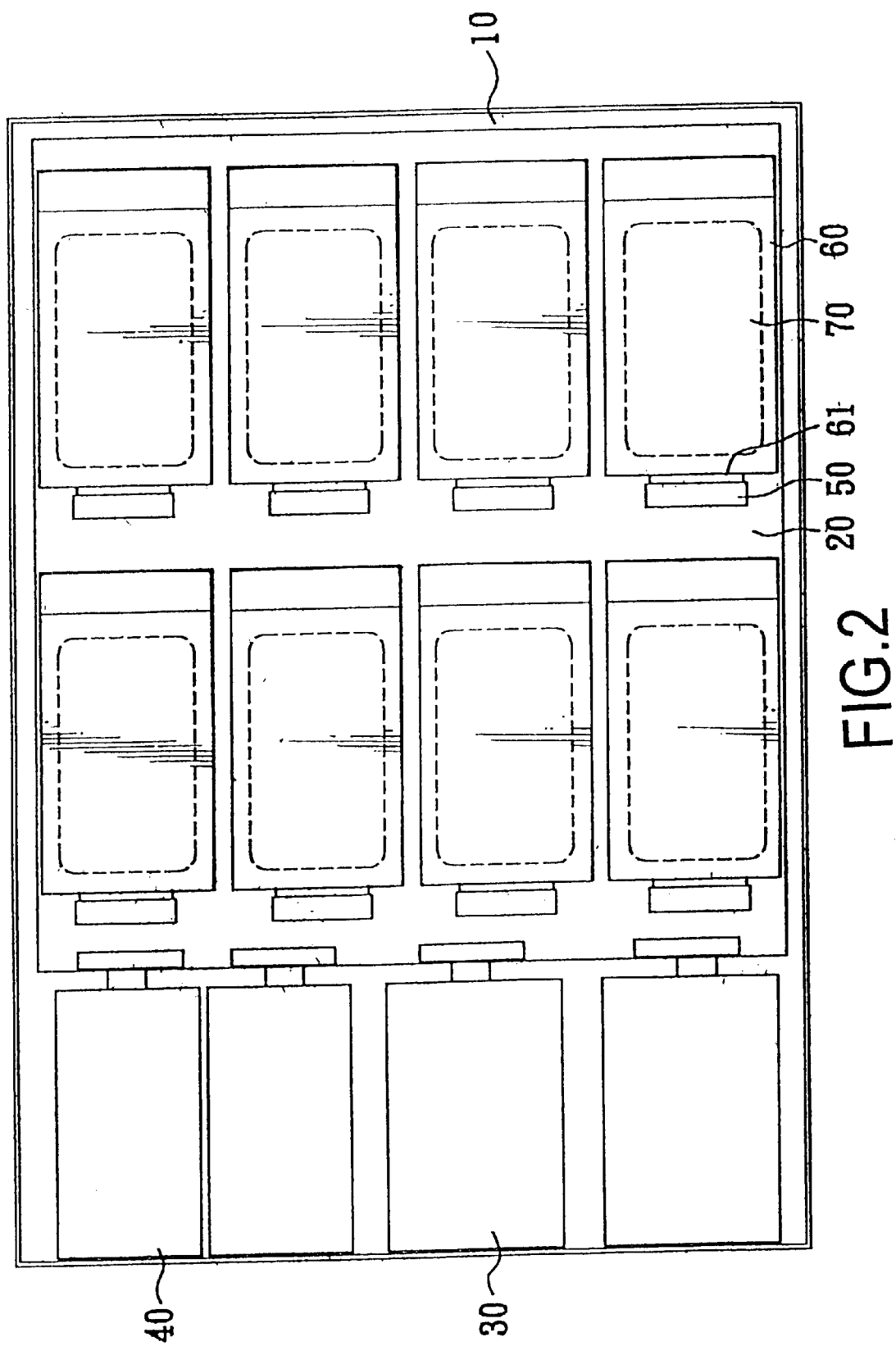
FIG. 2 displays the schematic diagram of look-down view.

FIGS. 1 and 2 display one of disk array system in accordance with this invention. The system consists of a frame case 10, mounted with a PC board 20. Beside the PC board, there provides a power supply 30 and a disk array signal control device 40. The power supply 30 and the disk array signal control device are connected to the PC board 20 by a circuit so to forward the power and the disk array control signal to the PC board. The PC board is designed to keep a distance from the adapter 50. One end of the adapter 50 is directed soldered to the PC board 20; the other end of the adapter 50 for a connection slot 51 to receive the terminals of power supply and the disk array control signal (not shown on the drawings.) The slot 51 is further plugged into the socket 61 on the rear of each removable hard disk cartridge 60, so rendering the bottom of the removable cartridge 60 closer to the PC board and reducing the frame case to lower position (1U is saved in this embodiment) than the standard height (4U) of the prior frame case. This design permits receiving more disk array system in the standard cabinet of the computer.

Figure 3:
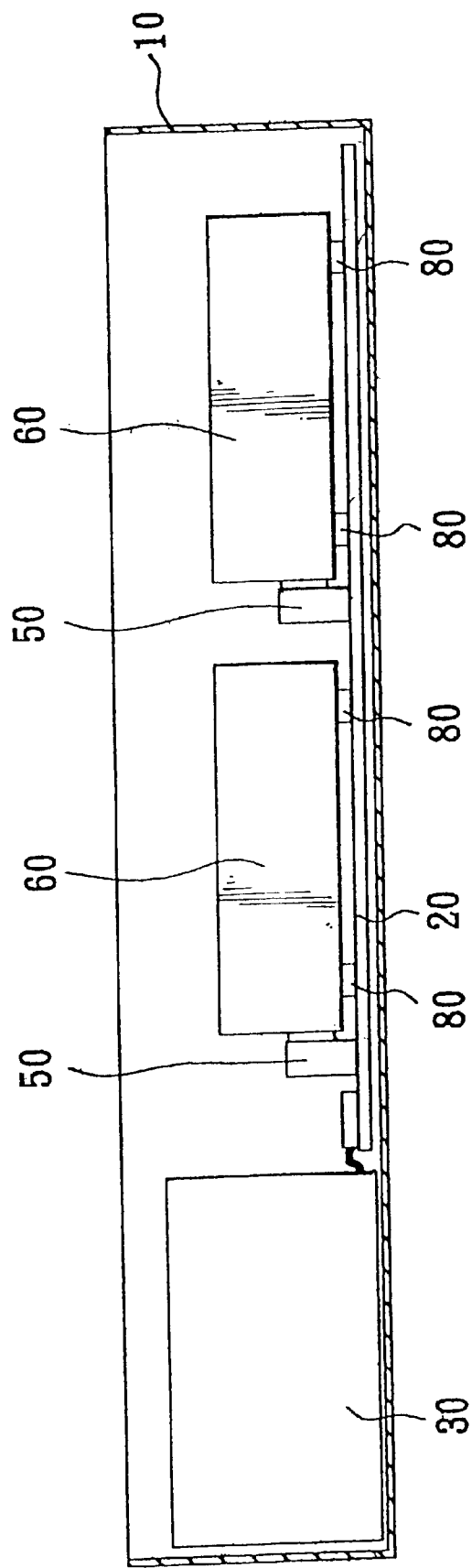
FIG. 3 illustrates the schematic diagram of sectional view.
Figure 4:
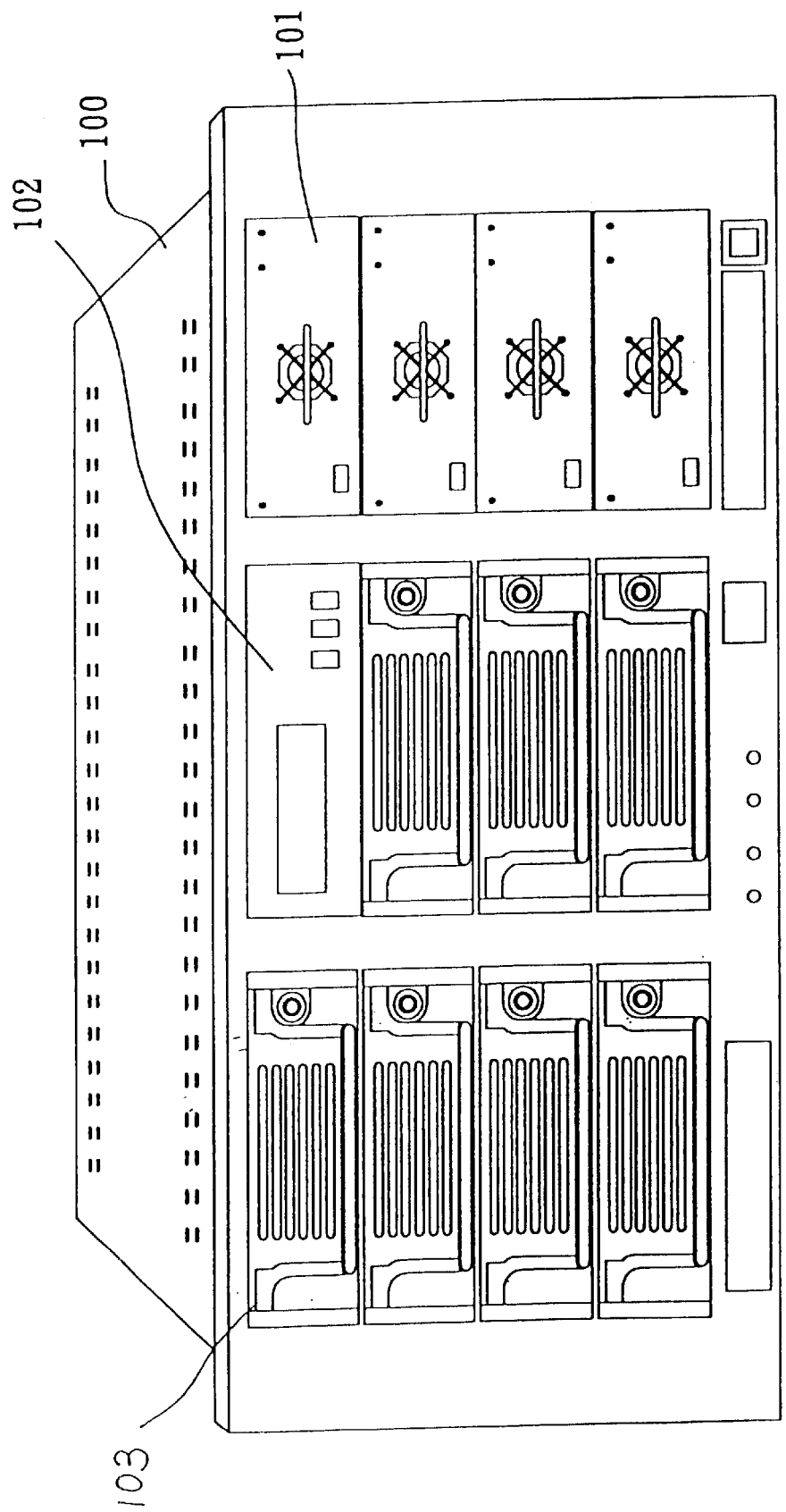
FIG. 4 shows the schematic diagram of prior art of disk array system.

As shown in FIGS. 2 and 3, the removable hard disk artridge 60 contains a hard disk 70 which will link with the PC board 20 by dint of socket 61 and the adapter 50 for the PC board 20 to exert the control over the hard disk 70. There provides a support 80 between the hard disk cartridge 60 and the PC board 20 to maintain the hard disk cartridge 60 and the PC board 20 always in proper position.

From the above description, it is understood that the frame work is a novel improvement which eradicate all weaknesses taking place on the prior art and working efficiency is hereby greatly upgraded, justified for application of new patent.

What is claimed is:

1. A disk array system for a plurality of removable hard disk cartridges comprising:

a) a frame case having a parallelepiped configuration with a bottom;

b) a printed circuit (PC) board on the bottom of the frame case extending parallel thereto, the PC board including a plurality of adapters directly mounted thereon, each adapter having a connection slot;

c) a plurality of hard disk cartridges, each having a generally parallelepiped configuration including an end face and a bottom face, and including a connecting socket extending from the end face and removably engaging the connection slot of one of the plurality of adapters; and, d) a plurality of supports on the PC board in contact with the bottom faces of each of the plurality of hard disk cartridges, whereby the plurality of cartridges are arranged in a side-by-side array, each with the bottom face adjacent to and spaced from the PC board.

* * * * *